INVENTORS
CARMELO J. AMATO,
& PAUL CHRISTIANSEN
BY Bosworth, Sessions
Herrshoff & Cary
ATTORNEYS

United States Patent Office 3,493,841
Patented Feb. 3, 1970

3,493,841
CYCLOCONVERTER CONTROL CIRCUIT
Carmelo J. Amato, Livonia, Mich., and Paul Christiansen, Novelty, Ohio, assignors to Lear Siegler, Inc., Santa Monica, Calif., a corporation of Delaware
Filed June 6, 1968, Ser. No. 735,023
Int. Cl. H02m 7/48
U.S. Cl. 321—18                    12 Claims

ABSTRACT OF THE DISCLOSURE

Circuit means for selectively switching positive and negative current conducting groups within a cycloconverter in accordance with the cylcoconverter alternating output current levels or an alternating current corresponding thereto. In particular, an improved circuit for selectively switching such cycloconverter groups when the cycloconverter is supplying power to a complex RLC load, for example.

BACKGROUND OF THE INVENTION

Figure 1:
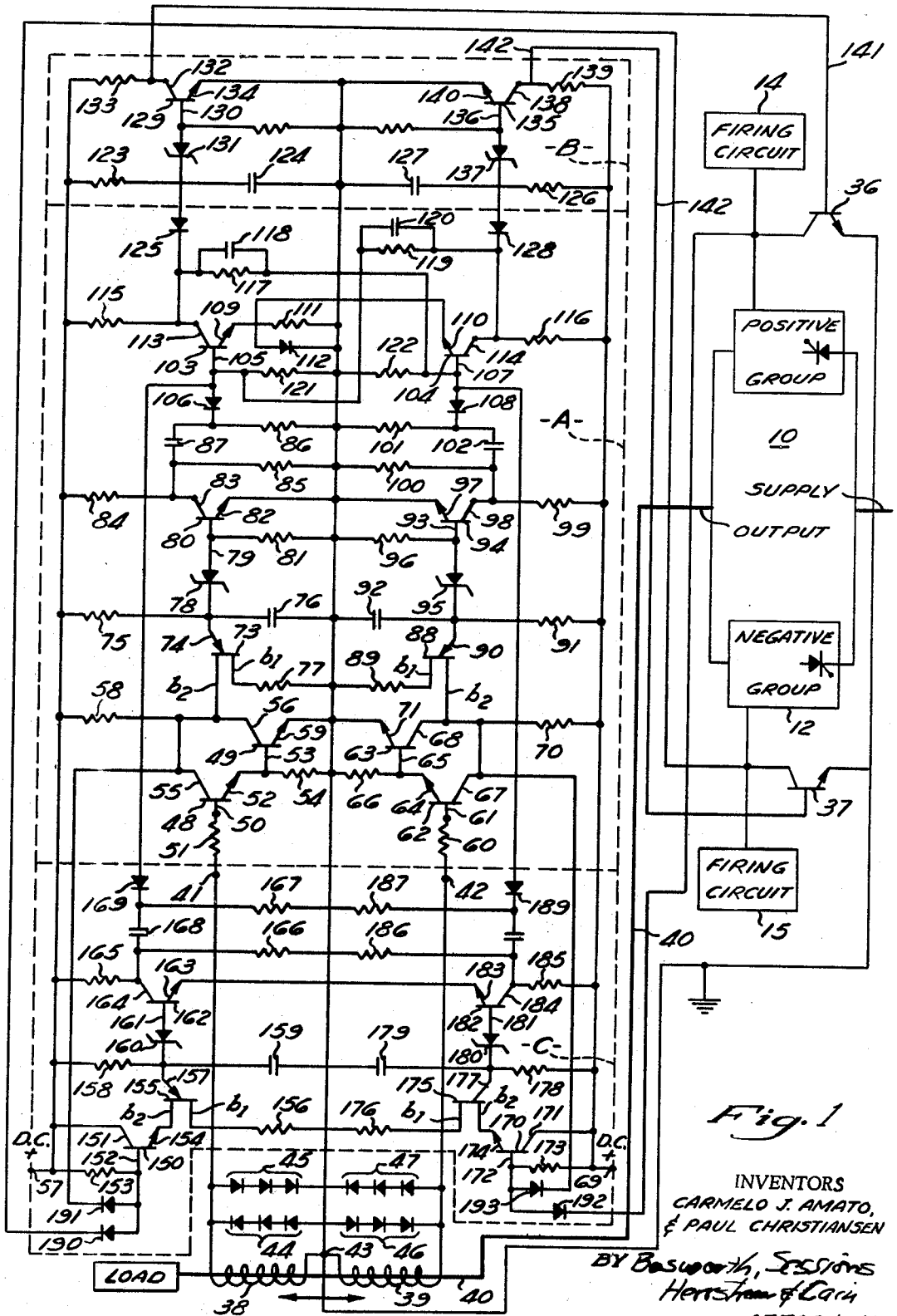

A cycloconverter characteristically comprises two major elements, a positive current group and a negative current group, connected in parallel between a supply and the cycloconverter output which is connected to a load. As is well known, each group may consist of a number of rectifying and switching devices, such as mercury arc rectifiers, silicon controlled rectifiers, or thyratrons, connected in some well-known rectifier configuration. The output current from each group can flow in only one direction. Therefore, in order to supply an alternating output current, the positive and negative groups must be connected back-to-back with respect to the output circuit so that each group may alternately provide a half cycle of each full cycle of output current.

It is well known in the cycloconverter art that instantaneous voltage differences may exist between the positive and negative groups of switching and rectifying devices. These voltage differences produce deleterious currents which circulate between the positive and negative groups within the cycloconverter if steps are not taken to suppress and/or reduce them or to positively interrupt their paths. Intergroup circulating currents have been reduced or limited in the past by chokes employed in the current paths between groups, but such means do not eliminate the undesirable currents.

Theoretically, intergroup circulating currents can be eliminated by insuring that only one current-conducting group is permitted to conduct at a time. This can be accomplished by blocking, diverting, or otherwise suppressing the switching pulses supplied to the rectifying and switchnig devices of one group while permitting the switching pulses supplied to the other group of rectifying and switching devices to activate or fire them in the usual sequence known in the cycloconverter art.

In order to provide an alternating current output, the positive and negative groups of switching and rectifying devices must conduct alternately and, therefore, the means for preventing intergroup circulating currents in a cycloconverter by blocking, diverting, or otherwise blanking the firing pulses provided for the two groups must act alternately with respect to the two groups. This function will be referred to in the description that follows as alternating group blanking or group switching.

This invention deals with alternating group blanking as described above which is activated or controlled by current information received from the two current- carrying groups. For example, circuit means for providing alternating group blanking or switching acts generally to blank firing pulses supplied to the positive group while the negative group is carrying current and to blank firing pulses supplied to the negative group while the positive group is carrying current. In theory, such an arrangement provides alternations in the group switching whenever the output current of the cycloconverter reaches zero current.

Alternating group switching timed in accordance with zero current in the alternating output current has certain limitations in practice, however, which produce undesirable results in the cycloconverter operation. One of these problems is inherent in a type of switching and rectifying device commonly employed in cycloconverter currentconducting groups. Such devices are of the type which are turned on by a control element which then loses control and is then unable to turn them off, such as thyratron or silicon controlled rectifiers. It is thus possible, when alternation in the group blanking occurs, that the blanked or non-conducting group may be turned on before all of the switching and rectifying devices of the other group have regained blocking control through changes in their anode-cathode voltages even though the firing pulses to the control elements of the switching and rectifying devices have been suppressed, diverted, or otherwise blanked.

This problem and a circuit providing a solution are disclosed and claimed in United States Patent No. 3,320,-514, granted May 16, 1967. Briefly, this circuit comprises an alternating switching circuit for providing alternate blanking and unblanking signals and introducing a time delay between the signal blanking a conducting group and the signal unblanking a non-conducting group.

Another practical problem in cycloconverter operation employing alternate group switching timed in accordance with zero output currents is encountered under certain operational conditions as, for example, when operating into a resistive load. This results in an alternating output current which characteristically has multiple or false zero current crossings near the beginning and ends of its positive and negative half waves. This can cause undesired and untimely switching from one current-conducting group to the other if only zero crossings of the output current are used to time such switching.

A full discussion of this problem encountered in cycloconverter operation and a novel solution and circuitry are set forth and claimed in United States Patent No. 3,320,515, granted May 16, 1967. Briefly, this circuit provides the appropriate group switching signals in response to changes in polarity of load current which persist a predetermined length of time.

The invention disclosed here is directed to the solution of still another practical problem encountered in cycloconverter operation and not dealt with and solved by the inventions of the two patents mentioned above. Switching an alternating current power source such as a cycloconverter into an electrically complex RLC load produces irregular current transients which include not only multiple and false zero current crossings but transients having current envelopes tangent to or near to current zero. Tangent approaches of the output current that are short of crossing and, in fact, do not cross zero current, but which are close enough to current zero to be within the normal current zero sensing threshold will usually cause the circuit disclosed in United States Patent No. 3,320,515 referred to above to switch the cycloconverter conducting groups. However, the group thus turned on will be of the wrong polarity to supply the current needed by the particular transient at that moment. Since the group able to supply current of the required polarity is blanked or turned off, no current will be supplied to the load. In no event will the group that has been turned on be able to supply current even of its own polarity until its group voltage is equal to or greater than the charge of the capacitive component of the load. The output current will remain at zero for a time dependent upon the RC time constant of the load circuit. Action of this type tends to distort and lengthen transients and, in some cases, does not permit the output voltage to reach normal, sinusoidal, steady state conditions. Active loads, such as motors with load torque disturbances or any other load which produces tangent or near tangent zero current envelopes, will produce substantial flats or portions of zero current in the output current wave form.

SUMMARY OF THE INVENTION

Briefly, this invention is embodied in a group switching circuit which seeks the current-carrying group capable of supplying the current required by the load after a group has been gated or unblanked for a predetermined time without supplying any current to the load. Thus, when tangent zero currents are encountered for whatever reason and output current stops as explained above, the circuit of this invention will automatically switch to or unblank the current group then blanked after a predetermined time without current so that output current will be supplied to the load as required.

The invention is shown and described in the environment of and in combination with the group switching circuit fully disclosed and claimed in U.S. Patent No. 3,320,515 mentioned above. This is not done to limit the invention to the particular features present in the patented circuit, but rather to show it in a realistic application and as a complementary and useful adjunct to a highly successful circuit. As shown, this invention accomplishes the solution of the problem described above of operating a cycloconverter into a complex RLC load and also permits the simultaneous use and advantages of the group switching circuit previously referred to.

DETAILED DESCRIPTION OF THE DRAWINGS

FIGURE 1 is a circuit diagram showing the circuit of this invention; and

Figure 2:
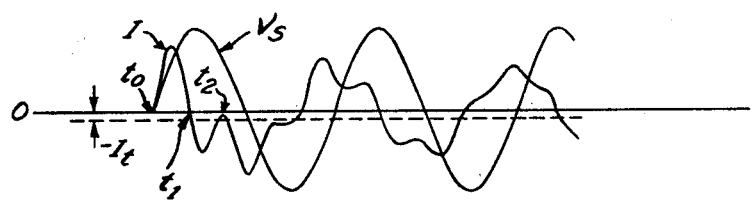
Figure 3:
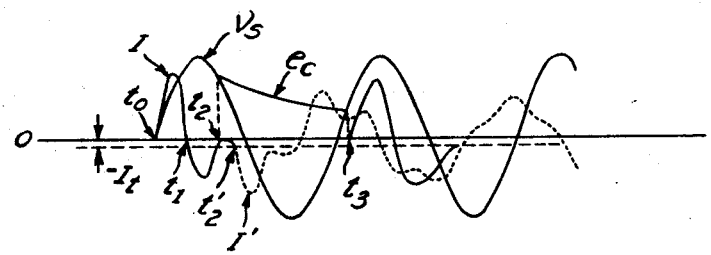

FIGURES 2 and 3 of the accompanying drawings are graphical representations of voltage and current wave forms illustrating the problem solved by this invention.

DESCRIPTION OF A PREFERRED EMBODIMENT

The problem solved by this invention is graphically illustrated in FIGURES 2 and 3 of the accompanying drawings. FIGURE 2 shows a voltage wave form $V_s$ and a typical transient current wave form I which might result when switching an alternating current power source onto a complex RLC load. In order to accommodate such a current transient, the power source must permit a current reversal at $t_1$ and a tangent current zero at $t_2$.

When the power source is a cycloconverter, the group switching circuit of United States Patent No. 3,320,515 and with which the present invention is shown in combination can readily handle the current reversal at $t_1$, but cannot provide effective control at the tangent current zero at $t_2$.

FIGURE 3 illustrates the problem of handling the transient shown in FIGURE 2 as encountered by a cycloconverter which does not enjoy the advantages of this invention. At approximately $t_1$, the positive current-conducting group is blanked and the negative current-conducting group is permitted to conduct. Between $t_1$ and $t_2$, there is a current reversal in the transient bringing it in a positive going direction up to and above the negative current sensing threshold $-I_t$, such that the positive group will be unblanked and the negative group prevented from conducting. However, the positive group can only supply a positive current flow and the transient requires a negative current, so no current flows. This is indicated in FIGURE 3 by showing the transient current I in solid line when a cycloconverter group is supplying current and in broken line when no cycloconverter output current is being supplied.

Also at or near tangent current zeroes as at $t_2$, $dI/dt$ is about zero and, thus, the charge on the capacitive component of the load $E_c$ is about equal to cycloconverter or source voltage $E_s$. At $t_2$, $E_s$ is decreasing to values lower than $E_c$ so that it cannot even supply positive current flow to the load if required because of the high $E_c$ opposing it.

Following $t_2$, the output current will remain at zero until the positive group voltage is greater than load capacitance charge $E_c$ and until the transient requires positive current flow. The voltage difference will depend in part on the initial voltage $E_c$ and the RC time constant of the load circuit. Current flow is resumed at $t_3$ as indicated by solid line I and another transient begun. The action thus described produces substantial flats in the output current and tends to distort and lengthen transients in some cases.

FIGURE 1 is a circuit diagram of the improvement of this invention combined with the circuit diagram of the group switching circuit of United States Patent No. 3,320,515 mentioned above and includes a schematic representation of a cycloconverter 10. The description of the circuit and its operation contained in that patent is incorporated herein by reference. Portions A and B of the circuit contained within broken outline boxes and the output current sensing portion of the circuit are as fully disclosed and claimed in the aforementioned patent. An understanding of these portions of the circuit and their relationship to cycloconverter 10 is necessary to an understanding of this invention. For convenience, a description of them and their operation substantially as set forth in the patent above is repeated here.

Cycloconverter 10 comprises a positive current-conducting group 11, a negative current-conducting group 12 and associated firing circuits 14 and 15, respectively.

Associated with the positive group 11 and its firing circuit 14 is a transistor 36 arranged to divert firing signals supplied by firing circuit 14 from positive group 11 through its collector-emitter circuit to ground. Thus, when a suitable signal is supplied to the base of transistor 36, positive group 11 is rendered non-conducting because the firing signals for activating its switching and rectifying devices are blanked or diverted from it. In the absence of such an appropriate signal to the base of transistor 36, positive group 11 is rendered conducting because the firing signals provided by firing circuit 14 are permitted to reach the switching and rectifying devices making up positive group 11.

A transistor 37 is similarly arranged with respect to negative group 12 and its firing circuit 15 for controlling the conduction of negative group 12 in accordance with signals supplied to the transistor base.

On the left side of FIGURE 1 is shown a cycloconverter alternating output current sensor indicated generally by the reference numeral 38. Current sensor 38 comprises a center-tapped current transformer having a secondary winding 39 inductively associated with cycloconverter output conductor 40 and provided with output terminals 41 and 42 at its opposite ends and a center tap terminal 43. The output voltage of secondary winding 39 is preferably limited to an appropriate maximum value by four sets of serially connected diodes 44, 45, 46, and 47. Diode sets 44 and 45 are connected in opposite direction across that portion of secondary winding 39 between output terminal 41 and center tap 43. Diode sets 46 and 47 are connected in opposite directions across that portion of secondary winding 39 between output terminal 42 and center tap 43. The output voltage appearing between either of the output terminals 41 or 42 and the center tap 43 is thus limited to the value of the forward voltage drop across diode sets 45 and 47 or diode sets 44 and 46. Any number of serially connected diodes may be employed in each set, of course, in order to determine the desired maximum output voltages appearing between the output terminals and the center tap of secondary winding 39.

Secondary winding 39 of current sensor 38 is so arranged that pulses of a given polarity with respect to center tap 43 alternately appear at output terminals 41 and 42 of current sensor 38 in response to alternating output current $I_L$. A positive pulse appears at output terminal 41, for example, when negative group 12 is conducting and providing one half cycle of alternating output current $I_L$. A positive pulse appears at output terminal 42 when positive group 11 is conducting and providing the other half cycle of alternating output current $I_L$. As a result of diode sets 44–47, the voltage pulses appearing at the output terminals 41 and 42 are generally clipped sinusoidal pulses resembling square wave, low amplitude pulses.

Current sensor 38, as particularly described above and as shown in FIGURE 1, comprises a preferred means for supplying alternating trigger pulses to the alternating group switching circuit means. However, other suitable sensing means can be used.

In portion A of the circuit of FIGURE 1, output terminals 41 and 42 of current sensor 38 are each connected to an amplifier. Terminal 41 is connected to an amplifier comprising transistors 48 and 49 arranged in the well-known Darlington connection. Base 50 of transistor 48 is connected to terminal 41 through resistor 51. Emitter 52 of transistor 48 is connected to base 53 of transistor 49 and to ground and center tap 43 of secondary winding 39 through resistor 54. Collectors 55 and 56 of transistors 48 and 49, respectively, are connected together and to a source 57 of positive direct current potential through resistor 58. Emitter 59 of transistor 49 is connected to ground.

The other output terminal 42 is connected through resistor 60 to base 61 of transistor 62. Transistor 62 is coupled with transistor 63 in a Darlington connection with the emitter 64 of transistor 62 connected to the base 65 of transistor 63 and to ground through resistor 66. Collectors 67 and 68 of transistors 62 and 63, respectively, are connected together and to a source 69 of direct current potential through resistor 70. Emitter 71 of transistor 63 is connected to ground.

The output signal of the amplifier associated with output terminal 41 appearing at common collector connection of transistors 48 and 49 is connected to base 2 of unijunction transistor 73. Emitter 74 is connected to the junction between an RC combination of resistor 75 and capacitor 76 which, in turn, are connected to a positive source 57 of direct current potential and to ground, respectively. Base 1 of unijunction transistor 73 is connected through resistor 77 to ground. Emitter 74 of unijunction transistor 73 and the junction of the RC combination 75–76 are connected through Zener diode 78 to base 79 of switching transistor 80. Base 79 is connected to ground through resistor 81 and emitter 82 is connected directly to ground. Collector 83 is connected through resistor 84 to a source 57 of positive direct current potential.

The output pulses appearing at collector 83 of switching transistor 80 are applied to a differentiating circuit comprised of resistors 85 and 86 and capacitor 87 connected together in a well-known manner as shown. Thus, at the junction of resistor 86 and capacitor 87, there appear voltage spikes corresponding to the leading and trailing sides of the clipped output pulses of terminal 41 of current sensor 38.

The common collector connection of transistors 62 and 63 is connected to an identical circuit arrangement as is the common collector connection of transistors 48 and 49 described above. Briefly, base 2 of unijunction transistor 88 is connected to the common collector connection, base 1 is connected through resistor 89 to ground and emitter 90 is connected to the junction between an RC combination comprising resistor 91 and capacitor 92 which, in turn, are connected to a source 69 of positive direct current potential and to ground, respectively. The junction between the RC combination 91–92 is connected to base 93 of switching transistor 94 through Zener diode 95. Base 93 is also connected through resistor 96 to ground. Emitter 97 is connected directly to ground and collector 98 is connected to a source 69 of positive direct current potential through resistor 99. A differentiating circuit consisting of resistors 100 and 101 and capacitor 102 is connected to collector 98 as shown in FIGURE 1 so that voltage spikes appear at the junction of resistor 101 and capacitor 102 corresponding to the leading and trailing sides of the clipped output pulses appearing at output terminal 42 of current sensor 38.

The voltage spikes appearing alternatively at the junction of the RC combinations 86–87 and 101–102 comprise the input signals to a pair of NPN switching transistors 103 and 104, respectively, arranged and interconnected generally as a bistable multivibrator. The base 105 of transistor 103 is connected to the junction of RC combination 86–87 through diode 106 arranged to conduct away from the transistor base. Base 107 of transistor 104 is similarly connected to the junction of RC combination 101–102 through diode 108 arranged to conduct away from the transistor base. Emitter 109 and emitter 110 of the two transistors are connected together and to ground through a parallel arrangement of resistor 111 and diode 112 arranged to conduct toward ground potential. Collectors 113 and 114 of transistors 103 and 104, respectively, are connected through resistors 115 and 116 to sources 57 and 69 of positive direct current potential. The conventional multivibrator cross connections are employed and consist of the parallel combination of resistor 117 and capacitor 118 connected between collector 113 of transistor 103 and base 107 of transistor 104 and the parallel combination of resistor 119 and capacitor 120 connected between collector 114 of transistor 104 and base 105 of transistor 103. In addition, base 105 is connected to ground through resistor 121 and base 107 is connected to ground through resistor 122.

The bistable multivibrator described above is of generally conventional configuration and employs a pair of NPN switching transistors arranged so that the multivibrator is switched from one state to another by a negative trigger pulse applied to the base of the on or saturated transistor. Thus, the negative voltage spikes which appear alternately at the junctions of the RC combinations 86–87 and 101–102 trigger the switching of the bistable multivibrator section back and forth between its two stable states. The provision of the differentiating circuit in the trigger input of the two multivibrator transistors provides a sharp triggering action tending to precisely time the switching of the multivibrator with the zero crossing of the output current of the cycloconverter as sensed by current sensor 38.

The collector outputs of the two switching transistors 103 and 104 of the bistable multivibrator section supply the activating signals for controlling the blanked and unblanked condition of the firing signals provided for the two current-conducting groups of a cycloconverter. The multivibrator insures the general objective of permitting only one of the two groups to conduct at a time because of the inherent quality of multivibrators which involves the control of each of the switches by the other and prescribes that, at any given time, opposite conditions must exist in the two switches.

The outputs of the multivibrator comprising collector 113 of transistor 103 and collector 114 of transistor 104 are each connected to an RC time delay network contained generally within broken line box B and arranged to introduce a time delay between the occurrence of the blanking of one of the cycloconverter groups and the unblanking of the other group during the alternating group switching operation. This time delay feature is disclosed in connection with an astable multivibrator in United States Patent No. 3,320,514 mentioned above.

The RC time delay network associated with transistor 103 consists of resistor 123 and capacitor 124 connected as shown between source 57 of positive direct current potential and ground. A diode 125 is connected between the junction of resistor 123 and capacitor 124 and collector 113 of transistor 103 and arranged to provide low impedance conduction toward the collector.

Another RC network consisting of resistor 126 and capacitor 127 is associated with transistor 104 and connected as shown between source 69 of positive direct current potential and ground. A diode 128 is connected between the junction of resistor 126 and capacitor 127 and collector 114 and arranged to provide low impedance conduction toward the collector.

Associated with the RC combination 123–124 is an NPN switching transistor 129 having its base 130 connected through a Zener diode 131 poled as shown to the junction of RC combination 123–124. Source 57 of positive direct current potential is connected to collector 132 through resistor 133 and emitter 134 is connected to ground.

Another NPN transistor 135 is associated with the RC combination 126–127 having its base 136 connected through Zener diode 137 as shown to the junction of resistor 126 and capacitor 127. Source 69 of positive direct current potential is applied to collector 138 through resistor 139 and emitter 140 is connected to ground.

Output signals alternately appear at collectors 132 and 138 of transistors 129 and 135, respectively, in accordance with changes in state or switching of the bistable multivibrator. Output signals may appear at both collectors at the same time, though both may not be absent or off at the same time as will be described below.

As used in conjunction with a cycloconverter, collector 132 is connected by conductor 141 to the base of transistor 36 and collector 138 of transistor 135 is connected by conductor 142 to the base of transistor 37. As explained more fully below in connection with the circuit operation and its relationship to the cycloconverter, an output signal appears at collector 132 when negative group of the cycloconverter is providing output current and at collector 138 of transistor 135 when positive group 11 is providing output current. In this manner, the alternating output signals of the combined circuit means A and B are employed to divert, suppress or otherwise blank the firing signals intended for positive group 11 when negative group 12 is conducting and vice versa.

The operation of the alternating group switching circuit means is described below in conjunction with a cycloconverter. Let it be assumed that current provided by positive group 11 of cycloconverter 10 flows in the output circuit supplying the load. Current sensor 38 is arranged so that a voltage pulse appears at output terminal 42 and is applied to base 61 of transistor 62, turning on the Darlington-connected transistors 62 and 63. Conduction by transistor 63 places base 2 of unijunction transistor 88 essentially at ground potential. As a result, emitter 90 is in a low impedance state, resulting in a very low or nearly zero voltage across capacitor 92. At this point, transistor 94 is off for lack of sufficient base drive.

When the output current supplied by positive group 11 falls to zero, Darlington-connected transistors 62 and 63 immediately turn off to bias base 2 of unijunction transistor 88 to a high potential. The impedance seen at emitter 90 of unijunction transistor 88 increases and capacitor 92 begins charging through resistor 91 toward the potential of source 69 of direct current voltage. When the charge on capacitor 92 reaches the breakdown voltage of Zener diode 95, the diode conducts and turns on transistor 94. In the conducting state, collector 98 of transistor 94 falls essentially to ground potential. The change in potential of collector 98 is differentiated by the succeeding RC circuit and the discharge of capacitor 102 produces a negative voltage spike constituting a trigger signal to the base 107 of multivibrator transistor switch 104.

Under certain circumstances of operation when the cycloconverter output current $I_L$ might be of a form having multiple zero crossings, the output current supplied by positive group 11, for example, may fall to zero and then suddenly increase in a positive direction from zero. If such is the case and the positive output current resumes before the charge on capacitor 92 has reached the breakdown voltage of Zener diode 95, Darlington-connected transistors 62 and 63 will turn on, causing emitter 90 of unijunction transistor 88 to be driven to a very low impedance state from which it will not recover until capacitor 92 is fully discharged. In this manner, the time delay circuit containing capacitor 92 is completely reset so that it produces only complete time delays of a prescribed duration and cannot produce partial period time delays.

Considering the portion of this circuit whose operation has just been discussed, it will be apparent that a negative voltage spike produced by the discharge of capacitor 102 is produced and supplied to the base 107 of multivibrator switching transistor 104 every time that the ouput current $I_L$ supplied by positive group 11 of the cycloconverter falls to zero and remains zero or less for a predetermined length of time. Also, the negative voltage spike appears, if at all, a predetermined length of time after the ouput current $I_L$ first falls to zero. It will be apparent that the circuit provides a time delay whose length can be predetermined to negate the effect of multiple zero crossings of cycloconverter output current.

In a similar manner, Darlington-connected transistors 48 and 49 connected to output terminal 41 of current sensor 38 and the circuit elements following, such as unijunction transistor 73, RC combination 75–76, Zener diode 78, switching transistor 80 and the differentiating network, are responsive to that portion of the output current $I_L$, provided by negative group 12 of cycloconverter 10. When that portion of output current $I_L$ provided by negative group 12 crosses zero going positive, capacitor 76 begins charging through resistor 75 from source 57 of positive direct current potential. If output current $I_L$ remains positive with respect to the zero level long enough to charge capacitor 76 to the breakdown voltage of Zener diode 78, switching transistor 80 fires and the differentiating circuit connected to its collector output 83 produces a negative voltage spike for triggering switching transistor 103 of the multivibrator. The negative voltage pulse appears, if at all, a predetermined length of time after the output current $I_L$ supplied by negative current-conducting group 12 reaches zero going positive. If output current $I_L$ goes negative before capacitor 76 is charged to breakdown voltage of Zener diode 78, the capacitor is completely discharged and the time delay circuit reset.

From the foregoing partial explanation of the operation, it will be apparent that a negative voltage spike appears at one point in the circuit whenever the output current $I_L$ crosses the zero level going positive and remains across it for a predetermined length of time and a negative voltage spike appears at another point in the circuit when the output current $I_L$ crosses the zero level going negative and remains across it for a predetermined length of time. In order to provide the desired blanking of the firing pulses supplied by the firing circuits associated with each of the current-conducting groups, the junction of the two RC combinations 86–87 and 101–102 at which the negative voltage spikes appear are connected respectively to the two trigger inputs of the bistable multivibrator described above. When a negative voltage pulse appears at the junction of RC combination 101–102 as a result of the positive half wave of output current $I_L$ falling to and remaining below zero level for a predetermined length of time, transistor 104 of the multivibrator is forced into a non-conducting state or turned off. The turning off of multivibrator transistor 104 turns on transistor 103.

When transistor 103 conducts, the potential of collector 113 falls and capacitor 124 is effectively short circuited and discharged. The cathode potential of Zener diode 131 falls below breakdown voltage and switching transistor 129 is rendered non-conducting. When switching transistor 129 is non-conducting, the potential appearing at its collector 132 is high enough to turn on transistor 36 connected to it by conductor 141.

In the sequence of events related above in connection with the multivibrator, it will be observed that switching transistor 129 is rendered non-conducting immediately upon the occurrence of a negative voltage spike at the base 105 trigger input of transistor 104 of the multivibrator. As mentioned before, when transistor 36 is conducting, the firing pulses supplied by firing circuit 14 are diverted from positive group 11 so that it is effectively rendered non-conducting.

The turning off of transistor 104 by the negative voltage spike applied to its base 107 increases the potential of its collector 114 so that capacitor 127 charges through resistor 126. When the potential of capacitor 127 exceeds the breakdown voltage of Zener diode 137, a signal is supplied base 136 which turns on transistor 135. The potential of collector 138 falls substantially to zero potential when transistor 135 is conducting, removing the base drive by means of conductor 142 from switching transistor 37. In this manner, switching transistor 37 is turned off, permitting the pulses supplied by firing circuit 15 to render negative current group 12 conducting. Because of the time required to charge capacitor 127 after the appearance of the negative voltage spike trigger pulse to transistor 104 of the multivibrator, switching transistor 37 is not turned off and, thus, firing pulses are not supplied to current-conducting group 12 until after the passage of a predetermined length of time following the appearance of a trigger pulse at transistor 104.

The description of the circuit operation set forth immediately above can be extended to cover the operational condition of the negative current-conducting group supplying the cycloconverter output current and crossing the zero current level going positive; at which time, the pulse appearing at output terminal 41 of current sensor 38 disappears. In such case, if the output current remains on the positive side of the zero level for a sufficient length of time to permit capacitor 76 to reach a potential exceeding the breakdown voltage of Zener diode 78, a negative voltage spike trigger pulse will be applied to the base input 105 of transistor 103 of the multivibrator. Transistor 103 is immediately turned off, permitting capacitor 124 to begin charging. Transistor 129 turns on when the capacitor potential exceeds the breakdown voltage of Zener diode 131. Turning on of transistor 129 reduces the potential of its collector 132, removing the base drive applied by conductor 141 to the base of transistor 36 so that transistor 36 is turned off and the firing pulses supplied by firing circuit 14 render current-conducting group 11 conducting.

When transistor 103 of the multivibrator is turned off, transistor 104, of course, is turned on, effectively short circuiting capacitor 127 and turning off transistor 135. With transistor 135 turned off, its collector 138 is raised to a high enough potential to drive switching transistor 37 into a conducting state. Thus, firing pulses provided by firing circuit 15 are diverted from current-conducting group 12, rendering it effectively non-conducting.

From the foregoing, it will be apparent that the circuit embodying this invention, when used with a cycloconverter, provides a blanking signal for effectively rendering one of the two current-conducting groups non-conducting when that portion of the output current supplied by the blanked group crosses the zero current level and does so a predetermined length of time after the zero crossing condition is maintained. Also, as a result of the aforesaid zero crossing of the cycloconverter output current, the other and previously blanked current-conducting group is unblanked and permitted to conduct a predetermined length of time after the blanking of the other current-conducting group as described above.

It will be apparent that the problems of cycloconverter operation caused by multiple zero crossings and false zero crossings of the output current are solved by that portion of the circuit described above. The length of the time delay that occurs between the time of beginning of a true zero crossing of the output current and the appearance of an indicating negative voltage spike is, of course, dependent upon the relative values of the resistors, condensers, direct current voltage supply and breakdown voltage of the Zener diodes involved in the circuit. It has been found that the delay necessary to prevent a high percentage of false zero crossing signals from triggering the multivibrator is not deleterious in its net effect and results in an output current wave having substantially reduced distortion.

The portion of the circuit within broken outline box C comprises the improvement which permits effective operation of the cycloconverter, even when tangent current zero output current conditions are encountered. As shown, the circuit has generally identical upper and lower portions associated respectively with the upper and lower parts of the A and B circuit portions described above.

The upper part of the circuit C comprises an NPN transistor 150 having a collector 151 connected to positive D.C. source 57, and a base 152 also connected to source 57 through biasing resistor 153. Emitter 154 of transistor 150 is connected to base 2 of unijunction transistor 155. Base 1 of transistor 155 is connected to ground through series resistor 156 and emitter 157 is connected to the junction of an RC combination made up of resistor 158 and capacitor 159. The RC combination is connected between positive D.C. source 57 and ground as shown.

The junction of the RC combination 158–159 is also connected in series through Zener diode 160 to base 161 of NPN switching transistor 162. Emitter 163 of transistor 162 is grounded and collector 164 is connected to positive D.C. source 57 through resistor 165.

Signals appearing at collector 164 are converted into negative spikes or trigger pulses by a differentiating circuit made up of conventional arrangement of resistors 166 and 167 and capacitor 168 as shown. The negative pulse output of the differentiating circuit is fed through a rectifying diode 169 to the base 105 of bistable multivibrator transistor 103 described above. A negative trigger pulse from portion C of the circuit described above triggers bistable multivibrator in the same manner and with this same result in the remainder of the system as negative trigger pulses developed from current sensing transformer 38 in response to positive going zero crossings of the cycloconverter output current and fed to base 105 through diode 106 from differentiating network of resistors 85 and 86 and capacitor 87.

The lower part of circuit C as shown in FIGURE 1 corresponds, element for element, to the upper part. Transistor 170 has a collector 171 and a base 172 connected to positive D.C. power source 69, the latter through biasing resistor 173. Emitter 174 is connected to base 2 of unijunction transistor 175. Base 1 of this transistor is connected to ground through resistor 176. Emitter 177 is connected to the junction of an RC combination of resistor 178 and capacitor 179 is connected in series between positive D.C. source 69 and ground.

The junction of RC combination 178–179 is also connected in series through Zener diode 180 to base 181 of NPN switching transistor 182. Emitter 183 of transistor 182 is grounded and collector 184 is connected to positive D.C. source 69 through resistor 185.

A differentiating circuit made up of resistors 186 and 187 and capacitor 188 together with a rectifying diode 189 is connected to collector 184 of transistor 182 as shown for providing negative trigger pulses to base 107 of bistable multivibrator 104. These pulses are capable of triggering the multivibrator in the same manner and with the same results in the system as those developed by output current sensor 38 in response to a negative going zero crossing and applied to base 107 through diode 108 as described above.

The bases 152 and 172 of transistors 150 and 170, respectively, are each connected through blocking diodes to various points in the circuit reflecting various voltages responsive to cycloconverter operating conditions. Base 152 of transistor 150 is connected through blocking diode 190 to the collector of switching transistor 37 and negative group firing circuit 15 which it controls. Base 152 is also connected through blocking diode 191 to collector 55 of amplifying transistor 48. Thus, when transistor 37 is not conducting and directing firing circuit signals and voltage to ground and, as a consequence, negative group 12 is receiving firing signals, *and* when transistor 48 is not conducting and its collector is at high potential as a result of the output current supplied by the negative group going to zero, diodes 190 and 191 are blocked and transistor 150 conducts. If both of these conditions operating on blocking diodes 190 and 191 do not exist, transistor 150 will not conduct.

Blocking diodes 192 and 193, respectively, connect base 172 of transistor 170 to the collector of switching transistor 36 and positive group firing circuit 14 which it controls and to collector 67 of amplifying transistor 62. Diodes 192 and 193 are blocked under circumstances corresponding to those blocking diodes 190 and 191. When both diodes 192 and 193 are blocked, transistor 170 conducts. If *both* diodes 192 and 193 are not blocked, transistor 170 turns off.

When transistor 150 conducts, base 2 of unijunction transistor 155 is at high potential and its emitter 157 in a high impedance state. Capacitor 159 will then begin to charge toward the voltage of positive D.C. source 57 through resistor 158. When it reaches the avalanche voltage of Zener diode 160, transistor 162 will be turned on and the differentiating circuit and diode 169 will provide a negative trigger pulse to bistable multivibrator transistor 103.

As when such a pulse is applied to the base of transistor 103 through diode 106 and the circuit preceding it, transistor 103 is turned off and the state of the bistable multivibrator changed, resulting in transistor 36 being rendered non-conducting so that positive group 11 can supply current to the load. When transistor 103 is turned off, transistor 104 is, of course, turned on, resulting in the blanking of negative group 12 of the cycloconverter in the manner described above.

When transistor 170 conducts, a time-delayed negative trigger is supplied base 107 of transistor 104 in the manner described above with reference to transistors 150 and 103; and, as a consequence, transistor 104 and firing circuit 15 gating transistor 37 are turned off, permitting negative group 12 to conduct output current. Also, because of conventional multivibrator operation, transistor 103 is turned on and positive group 11 is prevented from supplying current to the load.

Under normal steady state conditions and in the absence of transients in the load current typified by the wave form shown in FIGURE 2, diodes 190 and 191 and diodes 192 and 193 will be simultaneously blocking for periods of time less than the time delay imposed by RC combinations 158–159 and 178–179 respectively. Therefore, the emitters of unijunction transistors 155 and 175 will avalanche before their associated timing capacitors reach the breakdown voltage of Zener diodes 160 and 180, respectively. Thus, no negative trigger pulses will be supplied to the trigger inputs of the multivibrator section of the circuit and it will operate as though portion C were not present.

During transients in the load current typified by the wave form of FIGURE 2, periods of no output current will occur as described above because the tangent current zero points normally cause the circuit to switch to a current-conducting group that cannot supply the current required until its voltage $E_s$ exceeds the capacitive voltage component $E_c$ of the load. During this period, the circuit feature of this invention takes over and seeks out the current-conducting group that can supply the current required by the transient condition *now*.

Referring to FIGURE 3, at approximately time $t_2$, negative group 12 is blanked and positive group 11 is unblanked. Although it is receiving firing signals, positive group 11 cannot at this time supply current to the load as explained above. Since negative group 12 is blanked, no output current will flow and Darlington transistor pairs 48–49 and 62–63 are not conducting. Therefore, blocking diodes 191 and 193 will both be blocked against forward conduction. When blocked, diodes 191 and 193 signal the no current condition in the output and call for the circuit to switch to the other current-conducting group.

The selection of the group to which the load should be switched is made by diodes 190 and 192 connected to the transistors 36 and 37 associated with positive and negative groups, respectively. In the case mentioned above, with the positive group unblanked and transistor 36 not conducting, blocking diode 192 is blocked. Since both diodes 192 and 193 are now blocking, transistor 170 conducts, resulting in a negative trigger pulse being applied to transistor 104 of the multivibrator turning it off and, thus, transistor 103 on. As a result, positive group 11 is turned off and negative group 12 is turned on, the latter being able to supply the current transient required.

Both blocking diodes 192 and 193 controlling the conduction of transistor 170 are blocked at about the same time approximately at $t_2$ and transistor 170 begins to conduct. A negative trigger pulse is supplied to and turns off multivibrator transistor 104, turning on multivibrator transistor 103 at some interval thereafter as determined by the time constant of RC combination 178–179. Thus, the circuit seeks out and blanks the group unable to supply the necessary load current a first predetermined interval after all load current stops and unblanks the group able to supply the load a second predetermined interval comprising the first interval mentioned and the unblanking time delay controlled by the RC combination 126–127.

When the negative group, in this example, is unblanked, there may be a brief interval before the firing of a switching and rectifying device in the negative group and an output current flow is re-established. If so, diodes 190 and 191 block and transistor 150 conducts. The time constant of RC combination 158–159, however, is selected to provide sufficient time for output current to be restored before the charge on capacitor 159 reaches the breakover voltage of Zener diode 160 anl sends a negative trigger pulse to multivibrator transistor 103.

In the event that, during the aforementioned time delays, the current transient changes and the polarity of current now required is different from that selected and supplied by the circuit portion C, the circuit will send another negative trigger pulse to again change the state of the multivibrator. The blanking circuit is free-running in this respect at a relatively high frequency. This prevents overloading of the firing circuit transformers and transistors due to unusually long firing pulse widths and permits the use of smaller-sized firing transformers.

Once load current is re-established by turning on of the current-conducting group able to supply the load, the circuit comprised essentially of the output current sensor and portions A and B operates in its normal manner without any assistance or control from portion C. Under conditions such as the positive going tangent current zero shown at $t_2$ in FIGURE 2, the improvement of this invention in combination with the conventional double-delay blanking control circuit acts automatically to turn on the current-conducting group that is able to maintain the cycloconverter output current. While this corrective action has been described in terms of the current transient situation at $t_2$ in FIGURE 3, it will be appreciated that the improvement of this invention will work as well and in a similar manner to that described above in order to restore outpue current flow interrupted by a negative going tangent current zero resulting from a switching transient or other reason.

This invention in combination with the aforementioned double-delay blanking circuit provides substantial benefit and advantage in the control and operation of cycloconverters. In particular, it expands the range and type of loads the cycloconverter can efficiently and effectively supply. The invention comprehends combination, however, with other than the particular blanking circuit with which it is shown and described above and it may be successfully employed with other blanking circuits with full advantage.

Those skilled in the art will appreciate that various changes and modifications can be made in the apparatus described herein without departing from the spirit and scope of the invention.

We claim:

1. In a power supply system having a first power source of one voltage polarity and a second power source of the opposite voltage polarity for supplying an alternating current to a load as required, a signal-producing control means for sensing zero load current and in response thereto making available to the load in alteration said power sources until one of them supplies the load current required and then terminating the alernate offers of said power sources to the load until the next load current zero.

2. The combination according to claim 1 in which said signal-producing control circuit means comprises:
   multivibrator means having two states for connecting said first power source to the load in one state and for connecting the said second power source to the load in the other state,
   current sensing means for detecting load current, and
   a free-running source of multivibrator trigger pulses connected to said multivibrator and said current sensing means and responsive to said current sensing means for triggering said multivibrator between its two states in alternation when the level of load current sensed is substantially zero.

3. The combination according to claim 2 together with time delay means associated with said trigger pulse source for delaying triggering said multivibrator between its two states in alternation for a predetermined interval after the level of load current sensed becomes and remains substantially zero.

4. The combination according to claim 3 together with a trigger pulse generator connected to said multivibrator and said current sensing means and responsive to said current sensing means for sending a single state-changing trigger pulse to said multivibrator when the level of said load current sensed becomes substantially zero and before said time-delayed free-running source of trigger pulses supplies pulses to said multivibrator.

5. The combination according to claim 2 in which said free-running source of multivibrator trigger pulses includes one output connected to said multivibrator for supplying trigger pulses to trigger said multivibrator into one state and another output connected to said multivibrator for supplying trigger pulses to trigger said multivibrator into its other state and also includes circuit means for delivering trigger pulses to said outputs in alternation, said source being responsive to the state of said multivibrator for selectively delivering a first trigger pulse from said source following a sensed current zero by said current sensing means to that one of its said outputs which changes the state of said multivibrator from its state at said sense current zero.

6. The combination according to claim 5 together with delay means associated with said trigger pulse source for delaying said first trigger pulse to said multivibrator for a predetermined interval after the level of load current sensed becomes and remains substantially zero.

7. The combination according to claim 6 togther with a trigger pulse generator connected to said multivibrator and said current sensing means and responsive to said current sensing means for sending a single state-changing trigger pulse to said multivibrator when the level of the said load current sensed becomes substantially zero and before said time-delayed free-running source of trigger pulses delivers said first pluse to said multivibrator.

8. In a cycloconverter system having a supply circuit, an output circuit, a pair of current-conducting groups connected in parallel with each other between and back-to-back with respect to said supply and output circuits for alternately conducting current from said supply circuit to said output circuit in response to firing pulses supplied to one of said pair of current-conducting groups and from said output circuit to said supply circuit in response to firing pulses supplied to the other of said pair of current-conducting groups to provide alternating cycloconverter output current, and a firing circuit means associated with and for supplying firing pulses to each of said current-conducting groups, the combination with said current-conducting groups and their associated firing circuits of current-controlling means responsive to the conducting state of each of said pair of current-conducting groups for insuring that only one of said pair of current-conducting groups conducts at one time,
   said current-controlling means comprising sensing means for sensing the current conducted by each of said groups and for providing signals indicating and corresponding thereto,
   firing pulse blanking means responsive to blanking and unblanking signals and associated with each of said groups and its firing circuit for permitting and preventing firming pulses to reach each of said groups,
   first group switching circuit means interconnecting each of said firing pulse blanking means and said sensing means and responsive to signals of said sensing means indicating when each of said groups becomes nonconducting for providing blanking signals to said firing pulse blanking means associated therewith and for terminating blanking signals being supplied said firing pulse blanking means associated with the corresponding other one of said groups,
   second group switching circuit means interconnecting each of said firing pulse blanking means and said sensing means and responsive to signals of said sensing means indicating when both of said groups become nonconducting and remain non-conducting for a predetermined length of time for providing a first blanking signal to said firing pulse blanking means last unblanked by said first group switching circuit means.

9. The combination according to claim 8 in which said first group switching circuit means includes a time delay network for delaying the blanking signals provided said firing pulse blanking means associated with said group which becomes nonconducting for a predetermined time interval of non-conduction by said group and sensed by said sensing means.

10. The combination according to claim 9 in which said second group switching circuit means comprises a free-running source of blanking signals.

11. The combination according to claim 8 in which said first group switching means comprises:
   a pair of inputs connected to said sensing means,
   a D.C. voltage source,
   a time delay network operatively connected to each of said inputs and said voltage source for time delaying indicating signals supplied by said sensing means to said inputs,
   a multivibrator having a trigger input connected to each of said time delay networks and to said D.C. voltage source and switchable from a first state to a second state in response to a signal from said time delay networks applied to one of said trigger inputs and from its second state to its first state in response to a signal from said time delay networks applied to the other of said trigger inputs, output circuit means operatively connected to said voltage source, to said multivibrator and to each of said firing pulse blanking means for providing an output signal to one of said firing pulse blanking means when said multivibrator is in its first state and to the other of said firing pulse blanking means when said multivibrator is in its second state, and in which said second group switching means comprises:

a trigger pulsing means including time delay network connected to and associated with each of said trigger inputs of said multivibrator, said pulsing means being responsive to the first and second stable states of said multivibrator and to the current-conducting states of said groups for selectively providing a first triggering signal to one of said inputs when both of said current-conducting groups are non-conducting, said one of said inputs selected being that which will change the then existing state of said multivibrator.

12. The combination according to claim 11 in which said second group switching means runs free and provides triggering signals to said inputs in alternation following said first triggering signal.

References Cited

UNITED STATES PATENTS

| | | | |
|---|---|---|---|
| 3,315,143 | 4/1967 | Lawrence et al. | 321—7 |
| 3,320,514 | 5/1967 | Lawrence | 321—45 |
| 3,320,515 | 5/1967 | Amato et al. | 321—45 |

LEE T. HIX, Primary Examiner

W. M. SHOOP, Jr., Assistant Examiner

U.S. Cl. X.R.

321—45, 69